(12) United States Patent
Krishnamoorthy et al.

(10) Patent No.: US 7,808,193 B1
(45) Date of Patent: Oct. 5, 2010

(54) MOTOR SPINDLE CONTROL SYSTEM AND METHOD

(75) Inventors: Ravishanker Krishnamoorthy, Singapore (SG); Foo Leng Leong, Singapore (SG)

(73) Assignee: Marvell International Ltd., Hamilton (BM)

(*) Notice: Subject to any disclaimer, the term of this patent is extended or adjusted under 35 U.S.C. 154(b) by 482 days.

(21) Appl. No.: 11/856,414

(22) Filed: Sep. 17, 2007

Related U.S. Application Data

(60) Provisional application No. 60/826,440, filed on Sep. 21, 2006.

(51) Int. Cl.
*H02P 6/00* (2006.01)
(52) U.S. Cl. .................. 318/400.16; 318/400.34; 318/400.35
(58) Field of Classification Search ........... 318/400.16, 318/400.34, 400.35, 400.01, 568.24, 560, 318/566, 567
See application file for complete search history.

(56) References Cited

U.S. PATENT DOCUMENTS

| | | | |
|---|---|---|---|
| 5,929,577 | A | 7/1999 | Neidorff et al. |
| 6,633,145 | B2 | 10/2003 | Shao et al. |
| 7,098,621 | B1 | 8/2006 | Leong et al. |
| 7,102,307 | B2 | 9/2006 | Shao |
| 7,138,776 | B1 | 11/2006 | Gauthier et al. |
| 7,196,484 | B1 | 3/2007 | Chui et al. |
| 7,224,138 | B2 | 5/2007 | DeCusatis et al. |
| 7,274,162 | B1 | 9/2007 | Krishnamoorthy et al. |
| 7,504,789 | B1 * | 3/2009 | Chui et al. ............. 318/400.26 |
| 7,514,894 | B2 | 4/2009 | Hoogzaad |

* cited by examiner

*Primary Examiner*—Karen Masih

(57) ABSTRACT

In a motor having a number of poles that have nominally equiangularly-spaced positions that in fact deviate from those positions, the actual periods between zero-crossings of the back-EMF generated during pole-pair interactions are measured. The ratios of the various pole periods can then be computed, and the motor drive profile can be adjusted for each pole by applying the respective ratio to fit samples of the back-EMF profile to each respective pole.

30 Claims, 13 Drawing Sheets

MOTOR SPINDLE CONTROL SYSTEM AND METHOD

CROSS REFERENCE TO RELATED APPLICATION

This application claims the benefit of U.S. Provisional Patent Application No. 60/826,440, filed Sep. 21, 2006.

BACKGROUND OF THE INVENTION

This invention relates to a system and method for controlling the spindle of an electric motor, and more particularly to a system and method for controlling the spindle of a motor that rotates the platter of a disk drive.

Controlling the speed at which the platter of a disk drive rotates is very important, because even a small error in angular position resulting from an error in speed control may result in an incorrect sector being read or written. It is therefore a nominal goal to determine disk speed as accurately as possible.

Position, and therefore speed, of a disk drive platter is commonly determined by detecting the back electromotive force (back-EMF) generated when one of the rotor poles passes one of the stator poles. For example, it is typical for a disk drive motor to have six poles, so that each pole-pair interaction theoretically signifies 60° of motor rotation. However, in practice, it is difficult during manufacturing to accurately position the poles. In particular, the rotor may not be perfectly formed, but even if the rotor is perfectly formed, mechanical differences in the windings of the various poles could result in effective positional differences among the poles. Therefore, from an electrical perspective, some sets of adjacent poles may be closer together than 60°, and other sets of adjacent poles may be further apart than 60°. These offsets may be slight, but may be enough to prevent achieving the desired 0.01% accuracy.

Commonly-assigned U.S. Pat. No. 7,098,621, which is hereby incorporated by reference herein in its entirety, describes a method and apparatus for deriving calibration data for a motor, and a method and apparatus for controlling a motor using that calibration data. In accordance with those methods and apparatus, one phase of the motor power supply is suppressed (i.e., tristated) during a time duration when back-EMF is expected to be detected, and at the same time one of the other phases is grounded and the third phase is pulled high. If the back-EMF is detected outside that duration, the duration is expanded. This is iterated until the back-EMF falls within the expanded duration. In addition, commonly-assigned U.S. Pat. No. 7,196,484, which is hereby incorporated by reference herein in its entirety, describes a method and apparatus for adjusting the power supply voltage to minimize current spikes during the tristating operation.

The foregoing methods allow clean measurement of back-EMF, and therefore of motor speed. This allows motor speed to be adjusted by adjusting the spindle drive current. However, adjustments occur only once every several revolutions, and between adjustments, the spindle drive current remains constant during motor operation. Therefore, as the rotor rotates with its poles effectively unevenly spaced, the motor speed varies slightly between poles, resulting in potentially unacceptable jitter, even though the average motor speed may be the desired motor speed.

Copending, commonly-assigned U.S. patent application Ser. No. 11/347,543, filed Feb. 3, 2006, which is hereby incorporated by reference herein in its entirety, describes a method and apparatus for measuring back-EMF to derive the actual period of each pole and to adjust the drive current accordingly from pole to pole to maintain constant motor speed and reduce jitter. Copending, commonly-assigned U.S. patent application Ser. No. 11/840,460, filed Aug. 17, 2007, which is hereby incorporated by reference herein in its entirety, describes a method and apparatus for measuring back-EMF to derive the back-EMF profile of each pole and to fit the drive profile to the back-EMF profile. However, that system assumes that the measured samples for the back-EMF profile belong to poles whose periods are equal. This could result in a drive profile that causes the motor to operate faster or slower than required in a particular period. Moreover, the system might attempt to compensate based on an assumption that the next pole period will be the same as the current pole period, and because it is not the same, the attempted compensation could actually make the speed variation worse.

It therefore would be desirable to be able to control the spindle drive current to minimize motor speed variations.

SUMMARY OF THE INVENTION

Assuming constant motor speed and uniform pole spacing, the period of the back-EMF waveform would be expected to be constant. However, if motor speed is constant but the period of the back-EMF waveform is not constant, the varying periods can be correlated to nonuniform pole spacing. Thus, in accordance with the invention, the period (preferably as measured between zero crossings) of the back-EMF waveform is measured over a number of electrical periods corresponding to a single revolution—i.e., a number of periods equal to the number of poles. For example, in a six-pole motor, as is commonly used in disk drives, the back-EMF waveform would be measured over six electrical periods. It does not matter when the measurement is started, as long as it is possible to identify which measurement corresponds to which pole. Thus, an index feature may be provided on one of the poles so that each pole can be identified by the number of pole-pair interactions after the index feature is detected.

Once the electrical periods have been measured, the relative pole spacings can be computed by determining the average of the electrical periods, which would be the value of each period in the ideal case where the poles were uniformly spaced, and then computing the ratio of each electrical period to that ideal period. The ratios so computed can be used to adjust the fitting of the measured back-EMF profile to each pole. Then, for any desired motor speed, the drive profile so fitted will achieve a uniform motor speed. It does not matter what speed the back-EMF periods are measured at. Although the absolute values of the periods are inversely proportional to speed, the relative values reflected by the ratios stay substantially the same. The relative values may change with temperature if the motor, and particularly the rotor, does not have a uniform coefficient of thermal expansion. However, for a small motor such as in a disk drive, the coefficient of thermal expansion can be assumed to be substantially constant across the entire motor. Therefore, adjustments based on the initial ratios will be valid substantially at any temperature.

Therefore, in accordance with the present invention, there is provided a method for controlling a motor, which motor has a number of poles. The method includes detecting back-EMF from pole-pair interactions, deriving, from that back-EMF detected from pole-pair interactions (a) information regarding periods of respective poles, and (b) a back-EMF profile, and determining a drive profile from the back-EMF profile using the information regarding periods. Apparatus for carrying out the method is also provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

The invention will now be described with reference to FIGS. 1-6.

Figure 1:
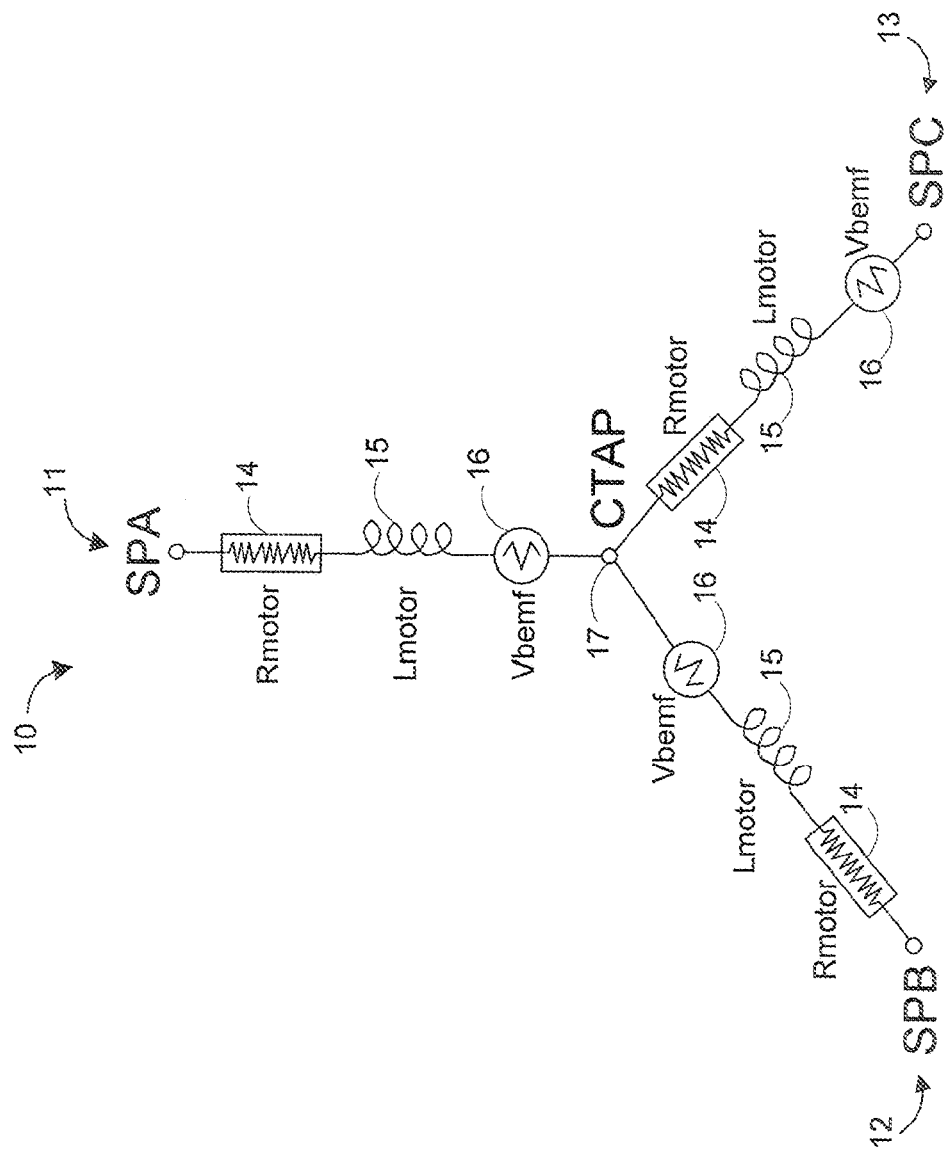
FIG. 1 is a diagrammatic view of theoretical pole placement in a motor, looking along the rotational axis of its rotor.

FIG. 1 shows, schematically, the three phases A (11), B (12) and C (13) of a three-phase motor 10 with which the present invention may be used. It should be remembered that the view of FIG. 1 is theoretical, notwithstanding that it looks like the rotor of a three pole-pair motor. The number of pole-pairs in the motor is completely independent of the number of power supply phases and the present invention will work with substantially any three-phase motor regardless of the number of pole-pairs.

As seen in FIG. 1, each phase A (11), B (12), C (13) of motor 10 may be modeled as a motor resistance $R_{motor}$ 14, a motor inductance $L_{motor}$ 15 and back-EMF voltage $V_{BEMF}$ 16 in series between a respective power supply phase SPA (110), SPB (120), SPC (130) and a central tap $C_{tap}$ 17 to which all phases are connected. Although the order of these components 14, 15, 16 is reversed in phase C (13) as compared to phases A (11) and B (12), the result would be the same if phase C (13) were identical to phases A (11) and B (12).

Figure 2:
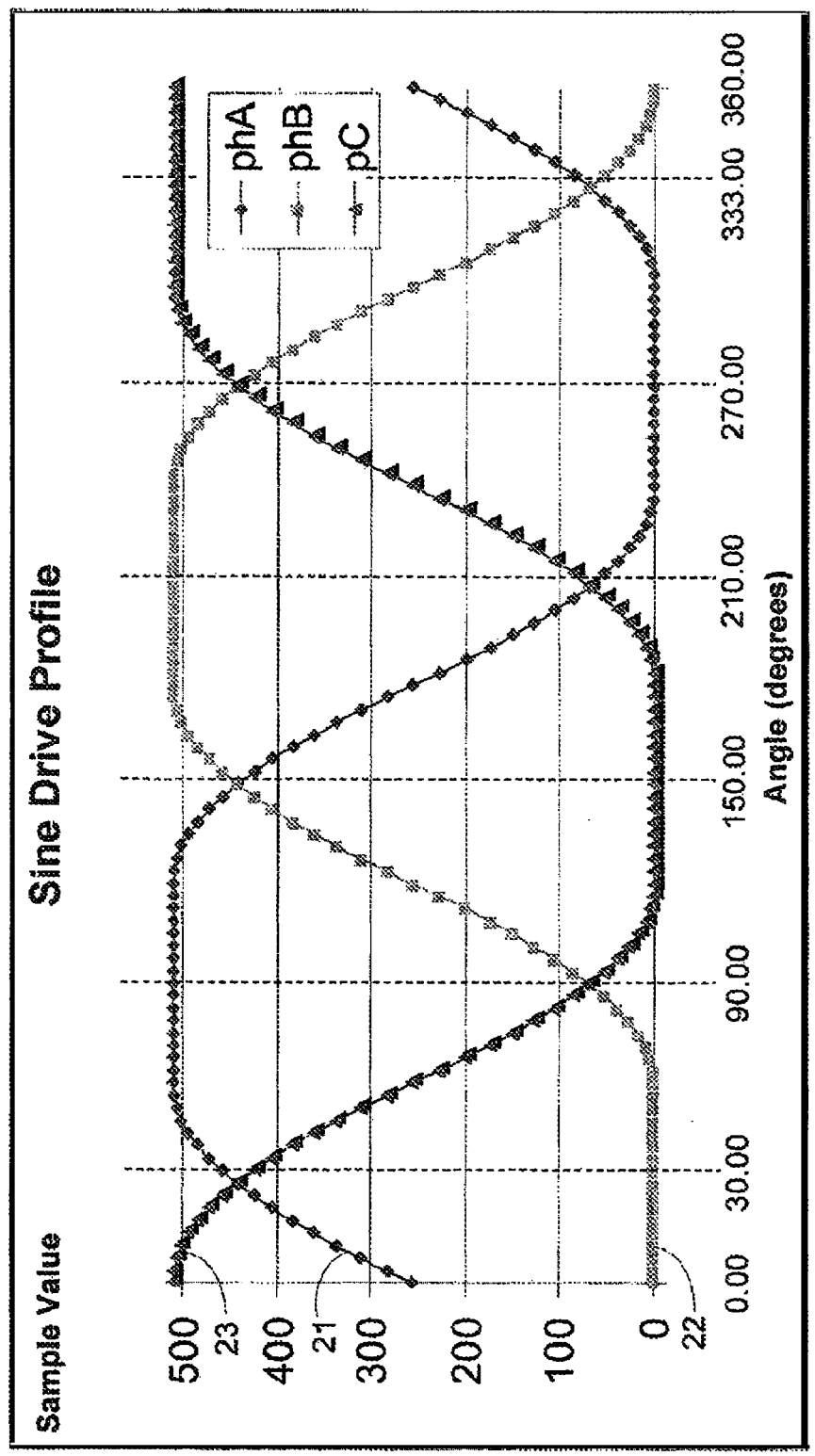
FIG. 2 is a graphical representation of a preferred embodiment of motor drive profiles for an ideal three-phase motor.

FIG. 2 shows drive profiles 21, 22, 23 in accordance with above-incorporated application Ser. No. 11/840,460, filed Aug. 17, 2007, applied to phases A, B and C, respectively, of an ideal three-phase motor. Each drive profile 21, 22, 23 represents voltage applied to a respective phase. As shown in FIG. 2, each profile 21, 22, 23 is applied as a series of discrete samples. In this embodiment, preferably 96 samples are applied during each complete electrical cycle, but another number—e.g., 192 samples—may be applied. Preferably, the number of samples used should be sufficient to approximate a smooth continuous signal.

Figure 3:
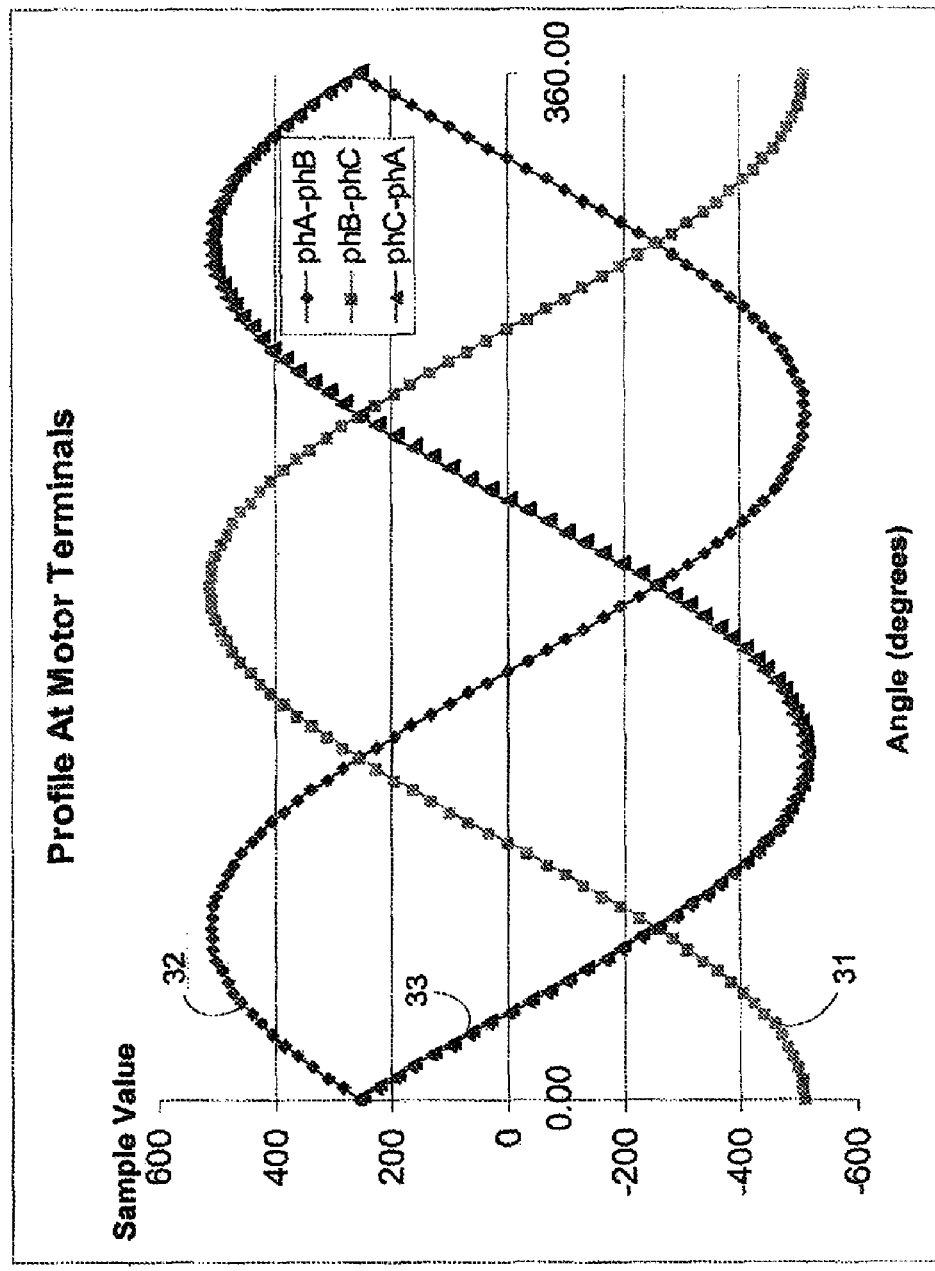
FIG. 3 is a graphical representation of the phase-to-phase voltages for the drive profiles of FIG. 2.

Drive profiles 21, 22, 23 preferably are determined by measuring the back-EMF across the active phase pairs of the motor during operation and deriving drive profiles 21, 22, 23, which are calculated to result in phase-to-phase voltage profiles such as profiles 31, 32, 33 of FIG. 3 that match the measured nonsinusoidal back-EMF profiles of the motor. The drive profiles of FIG. 3 resemble sinusoidal profiles, but are not truly sinusoidal. For example, each profile is flat or truncated at its maxima and minima, representing a "clipped" sinusoid. However, the phase-to-phase voltage profiles derived by plotting the differences between corresponding samples of the two active phases in FIG. 2, are substantially truly sinusoidal. This results in substantially sinusoidal drive current in each phase for an ideal motor.

If motor 10 is not ideal, and in fact the periods of the poles are not all the same, while the measured back-EMF will track the correct profile, the method of above-incorporated application Ser. No. 11/840,460, filed Aug. 17, 2007, will treat the samples of the measured profile, which are taken at a rate of, e.g., 96 samples per ideal pole period, as being uniformly distributed in time among the pole periods. However, because the motor is not ideal, for a pole whose period is longer than the ideal, 96 samples will represent less than the full profile for that pole, while for a pole whose period is shorter than the ideal, 96 samples will represent more than the full profile for that pole. Therefore, the drive profiles will not match the motor as they should.

The speed control circuitry of the motor will exacerbate the mismatch, because it measures the speed after each pole and attempts to correct the next pole accordingly. Thus, if a pole period is shorter than normal, so the motor spins too fast, the speed control circuitry will attempt to slow down the next pole. However, if the next pole period is longer than normal, the motor needs to speed up, rather than slow down, to maintain the correct speed.

Figure 4:
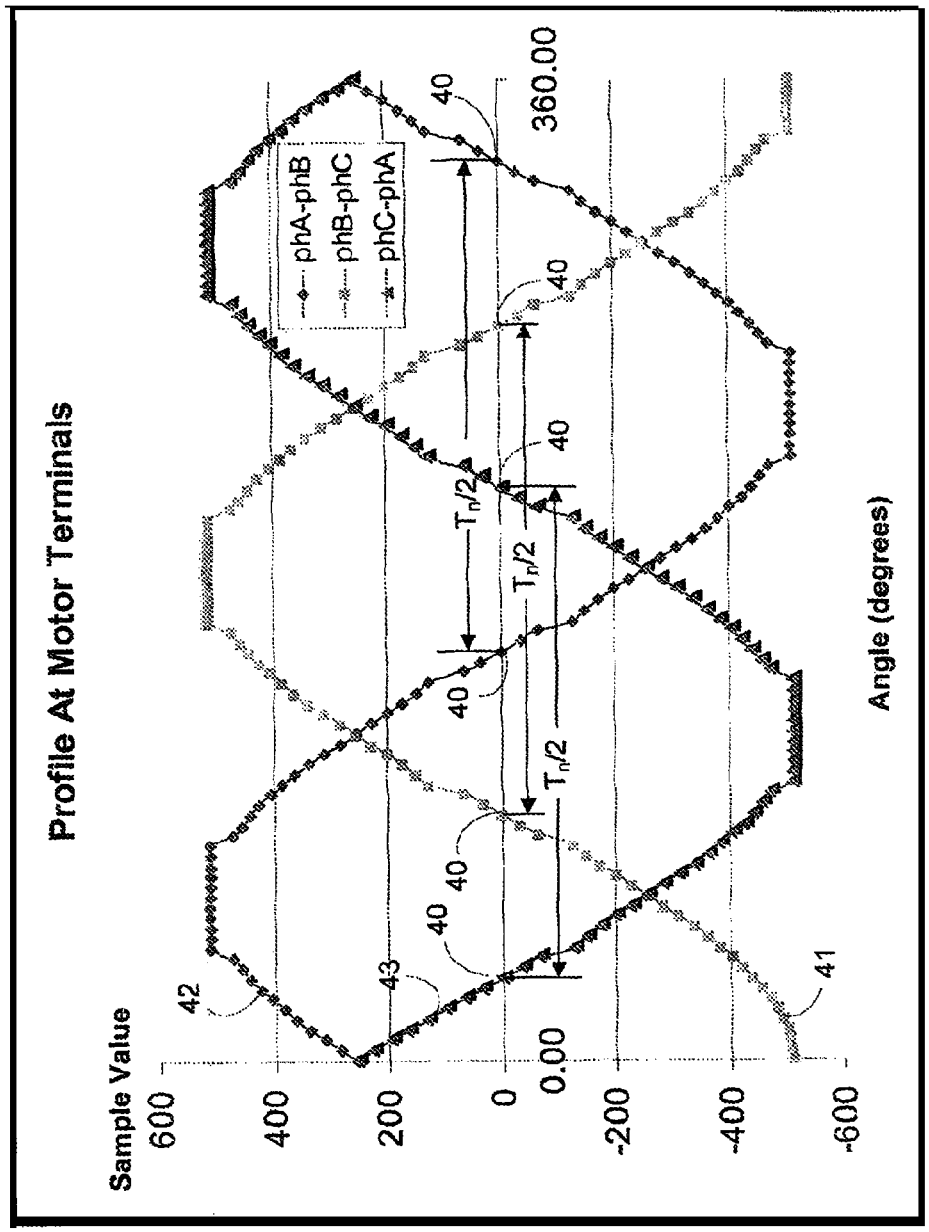
FIG. 4 is a graphical representation of the phase-to-phase voltages for the drive profiles of a non-ideal motor.
Figure 5:
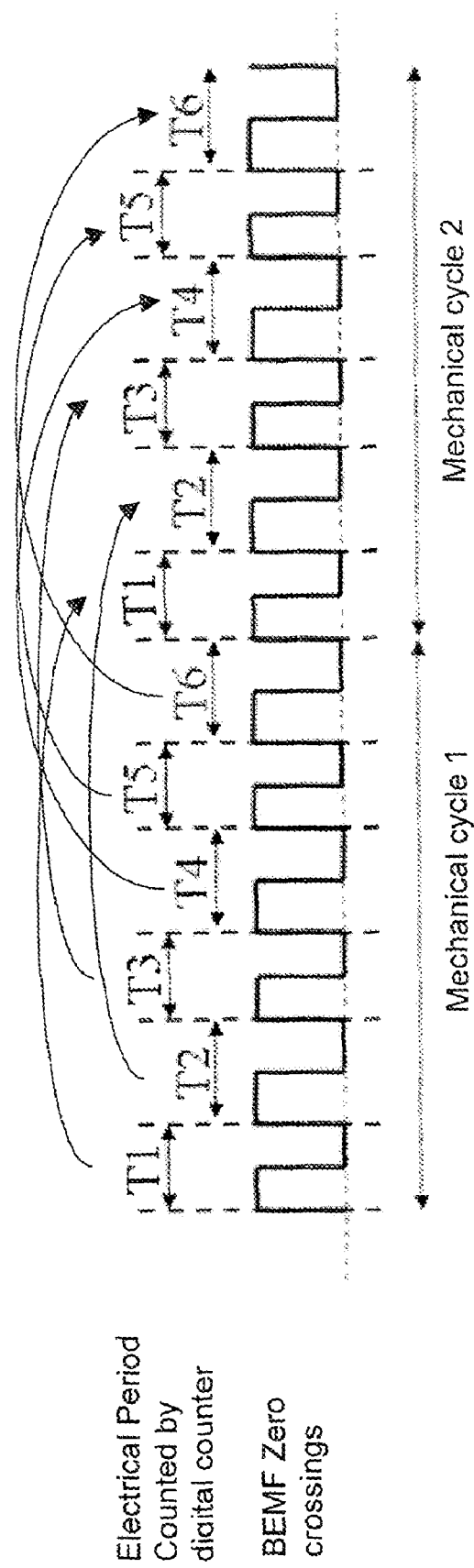
FIG. 5 is a representation of a method according to the present invention.

This discrepancy is accounted for in accordance with the present invention by taking the actual pole periods into account when fitting the drive profile. The actual pole periods can be measured by measuring the electrical periods between zero-crossings of any of the back-EMF traces 41, 42, 43 in FIG. 4 in one mechanical period (i.e., one revolution) of motor 10. As seen in FIG. 4, in addition to each trace 41, 42, 43 having a non-ideal profile shape, the periods $T_n$, as measured between zero-crossings 40 of any back-EMF trace 41, 42, 43, appear to be uniform (in FIG. 4, only three half-periods are visible), but they may vary slightly from one another (to a degree not visible in FIG. 4) as discussed above. When the back-EMF is measured during a subsequent mechanical period to determine the profile to which the drive current should be fit, the $T_n$ data are used to fit the drive profile to the measured back-EMF profile. Specifically, rather than assuming uniform $T_n$'s and dividing up the samples in the measured back-EMF uniformly, the samples are divided up according the actual $T_n$'s as previously determined. FIG. 5 shows how each $T_n$ as measured by zero-crossings in one mechanical cycle is carried forward to the same pole during—EMF profile measuring in a subsequent mechanical cycle.

Figure 6:
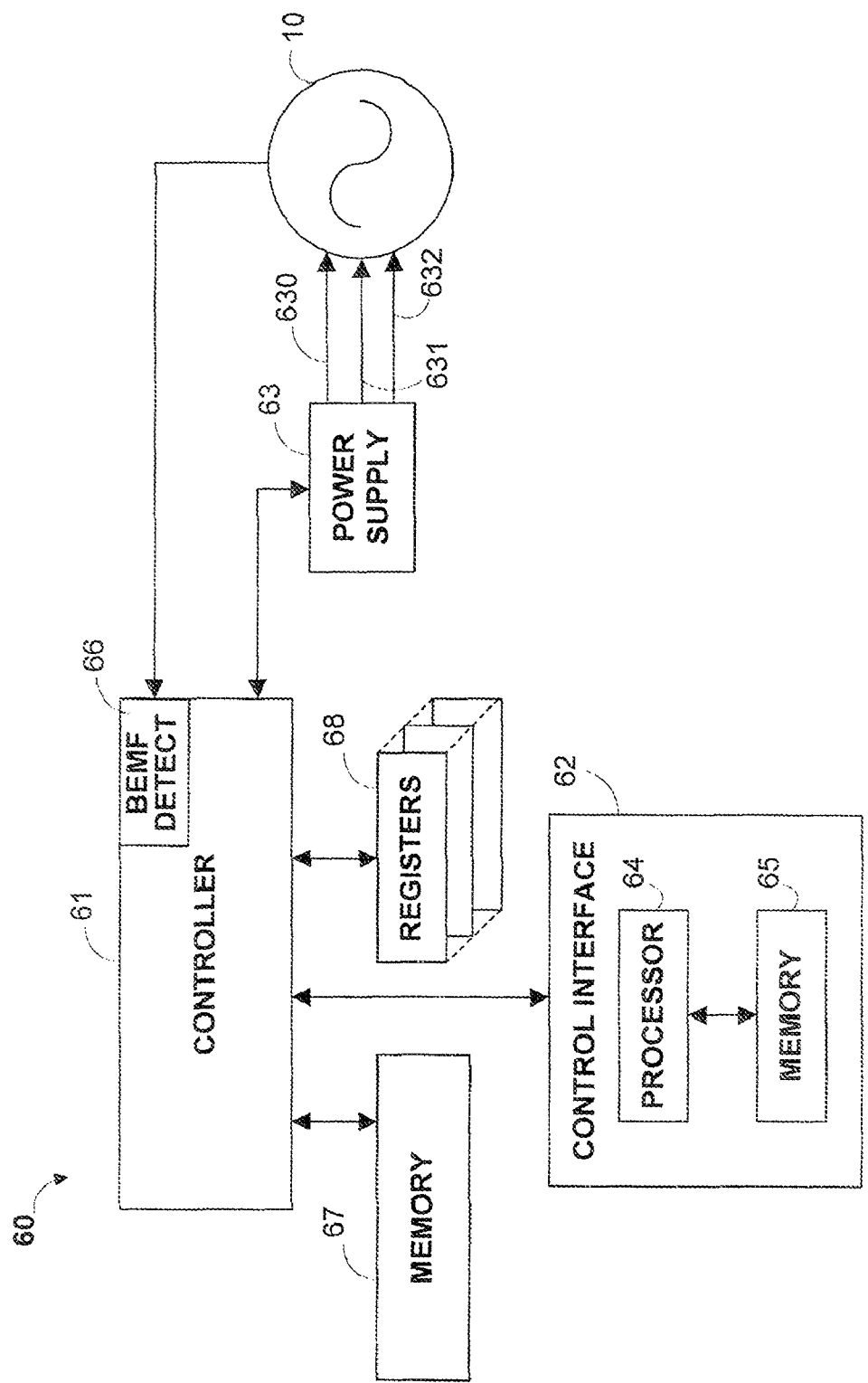
FIG. 6 is a schematic diagram of motor drive circuitry in accordance with an embodiment of the present invention.

FIG. 6 shows an embodiment of control circuitry 60 for practicing the invention. Control circuitry 60 includes a motor controller 61, a motor control interface 62, and a power supply 63 that provides the three voltage phases 630, 631, 632 to motor 10. Motor controller 61 is sometimes referred to as a Pcombo or power combo chip, and is normally mounted at or near spindle motor 10, controlling both spindle motor 10 and the voice-coil motor (not shown) that moves the read/write head. Motor control interface 62 is sometimes referred to as the device system-on-a-chip or "SoC," and is normally removed from motor 10 itself, as it is the main controller and interface of the device (e.g., a disk drive) of which motor 20 is a part. In the present invention, the drive profile fitting preferably is carried out in motor control interface 62 by processor 64 thereof, using memory 65 thereof.

Preferably, controller 61 includes back-EMF detection circuitry 66 which preferably detects during motor operation the back-EMF profiles across the various phase pairs and the back-EMF zero-crossings that determine the periods $T_1$-$T_6$, and preferably stores both the periods $T_1$-$T_6$, and the back-EMF profiles, in memory 67 or registers 68. Processor 64 of motor control interface 62 then uses those stored periods and profiles from memory 67 or registers 68 to compute drive profiles 630, 631, 632 for each phase, such that application of those profiles 630, 631, 632 to the three phases 11, 12, 13 causes the drive voltage across active pairs of phases 11-12, 11-13 or 12-13 to match the stored back-EMF profiles.

As mentioned above, the relative periods are substantially constant for a motor once manufactured, and therefore need be measured only once, and associated in memory with their respective poles. To allow the control circuitry to know which pole is the present pole, so that the correct stored values are used, a marker, which may be an optical or magnetic mark, or any other suitably detectable mark, can be placed on the rotor adjacent a particular pole as a reference. Control circuitry 60 (FIG. 6) preferably can count cycles from the detection of that marker—e.g., by a suitable optical or inductive detector, identify the current pole, look up the appropriate $T_n$, and adjust accordingly the sampling of the back-EMF profile to derive the drive profile that will maintain constant motor speed.

Thus it is seen that a method and apparatus for controlling motor speed to avoid jitter, notwithstanding pole position deviations, has been provided.

Referring now to FIGS. 7-13, exemplary implementations of the present invention are shown.

Figure 7:
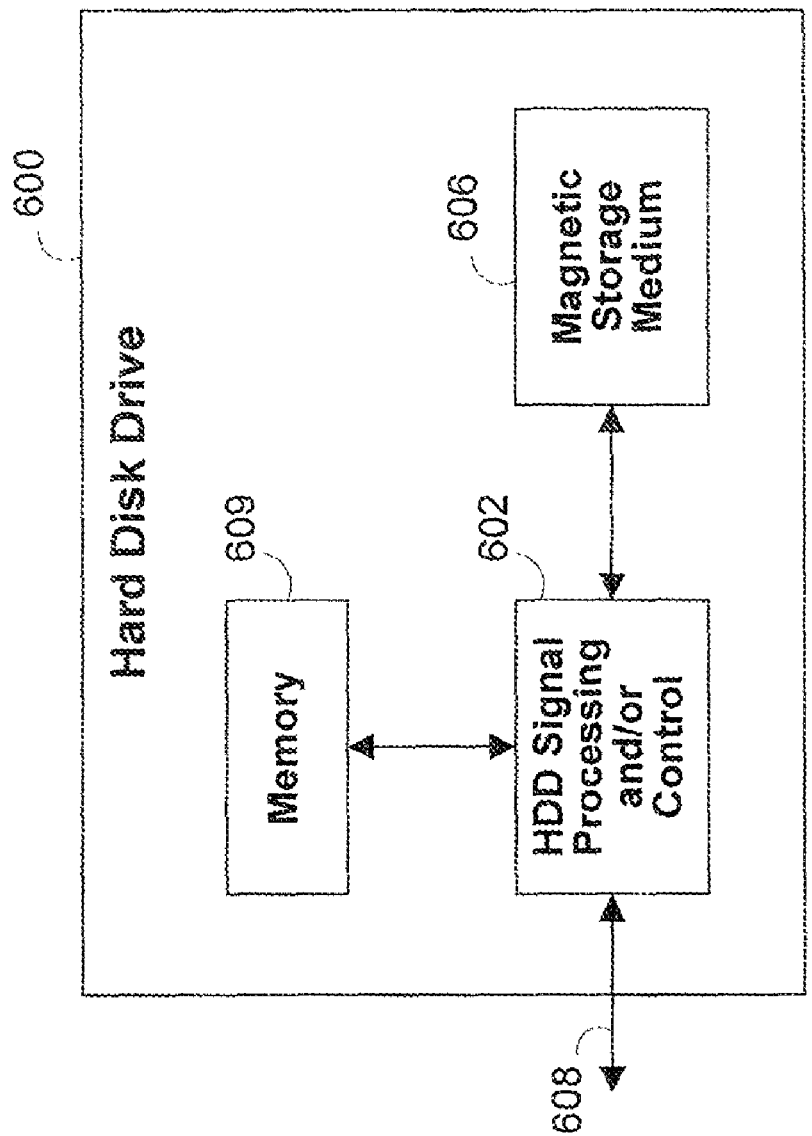
FIG. 7 is a block diagram of an exemplary hard disk drive that can employ the disclosed technology.

Referring now to FIG. 7 the present invention can be implemented in a hard disk drive 600. The present invention may implement either or both signal processing and/or control circuits, which are generally identified in FIG. 7 at 602. In some implementations, the signal processing and/or control circuit 602 and/or other circuits (not shown) in the HDD 600 may process data, perform coding and/or encryption, perform calculations, and/or format data that is output to and/or received from a magnetic storage medium 606.

The HDD 600 may communicate with a host device (not shown) such as a computer, mobile computing devices such as personal digital assistants, cellular telephones, media or MP3 players and the like, and/or other devices, via one or more wired or wireless communication links 608. The HDD 600 may be connected to memory 609 such as random access memory (RAM), low latency nonvolatile memory such as flash memory, read only memory (ROM) and/or other suitable electronic data storage.

Figure 8:
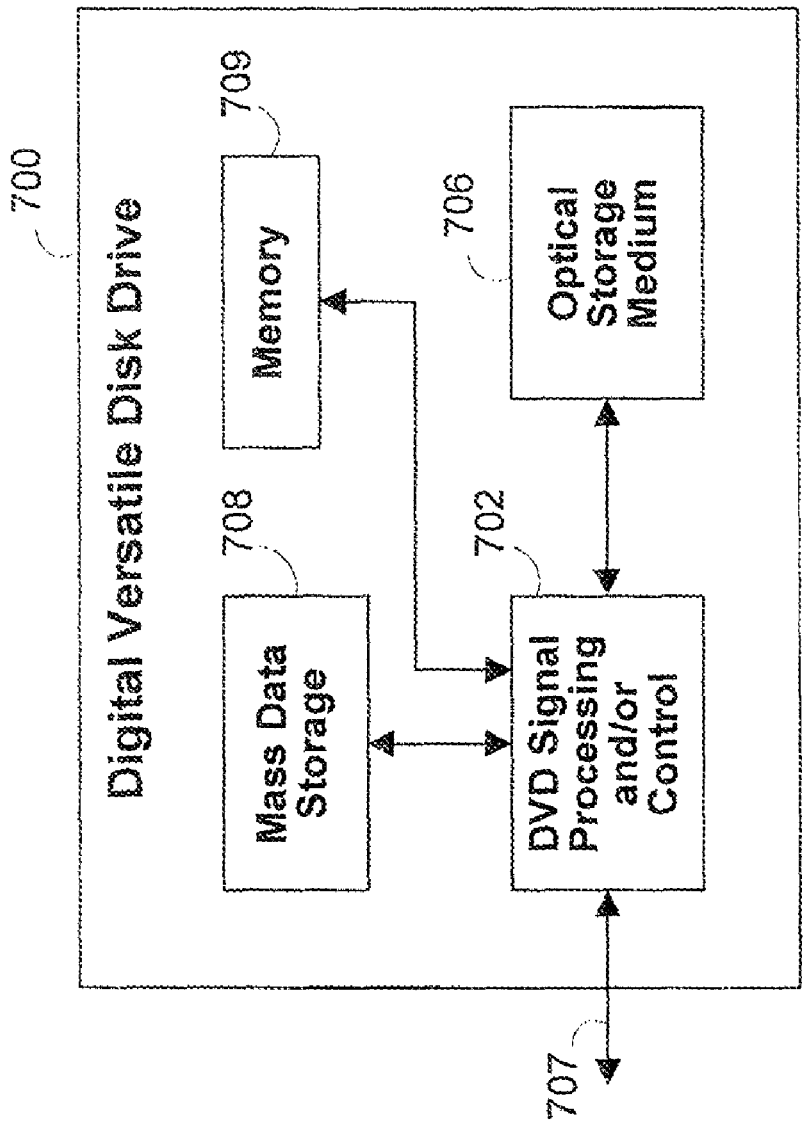
FIG. 8 is a block diagram of an exemplary digital versatile disk drive that can employ the disclosed technology.

Referring now to FIG. 8 the present invention can be implemented in a digital versatile disk (DVD) drive 700. The present invention may implement either or both signal processing and/or control circuits, which are generally identified in FIG. 8 at 702, and/or mass data storage of the DVD drive 700. The signal processing and/or control circuit 702 and/or other circuits (not shown) in the DVD drive 700 may process data, perform coding and/or encryption, perform calculations, and/or format data that is read from and/or data written to an optical storage medium 706. In some implementations, the signal processing and/or control circuit 702 and/or other circuits (not shown) in the DVD drive 700 can also perform other functions such as encoding and/or decoding and/or any other signal processing functions associated with a DVD drive.

DVD drive 700 may communicate with an output device (not shown) such as a computer, television or other device, via one or more wired or wireless communication links 707. The DVD drive 700 may communicate with mass data storage 708 that stores data in a nonvolatile manner. The mass data storage 708 may include a hard disk drive (HDD). The HDD may have the configuration shown in FIG. 7. The HDD may be a mini-HDD that includes one or more platters having a diameter that is smaller than approximately 1.8". The DVD drive 700 may be connected to memory 709 such as RAM, ROM, low-latency nonvolatile memory such as flash memory, and/or other suitable electronic data storage.

Figure 9:
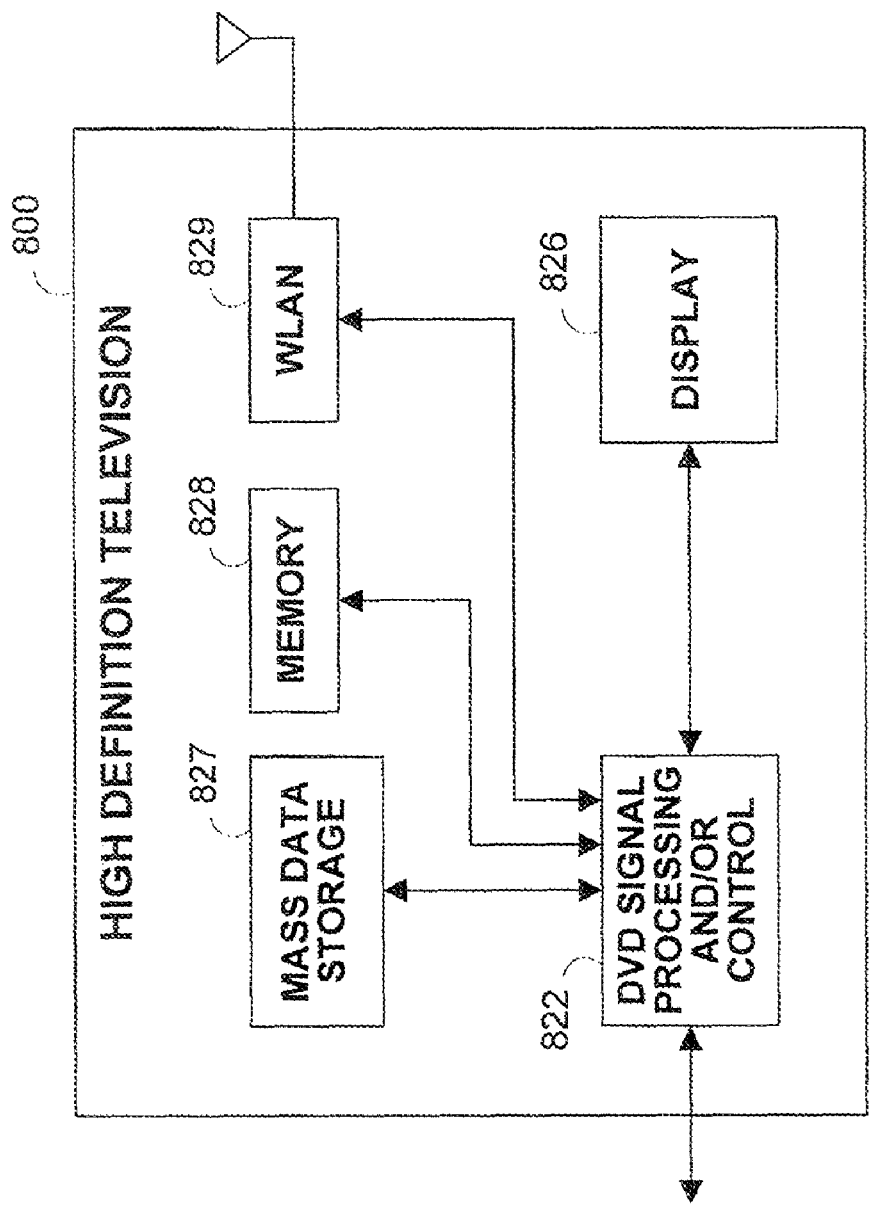
FIG. 9 is a block diagram of an exemplary high definition television that can employ the disclosed technology.

Referring now to FIG. 9, the present invention can be implemented in a high definition television (HDTV) 800. The present invention may implement either or both signal processing and/or control circuits, which are generally identified in FIG. 9 at 822, a WLAN interface and/or mass data storage of the HDTV 800. The HDTV 800 receives HDTV input signals in either a wired or wireless format and generates HDTV output signals for a display 826. In some implementations, signal processing circuit and/or control circuit 822 and/or other circuits (not shown) of the HDTV 800 may process data, perform coding and/or encryption, perform calculations, format data and/or perform any other type of HDTV processing that may be required.

The HDTV 800 may communicate with mass data storage 827 that stores data in a nonvolatile manner such as optical and/or magnetic storage devices. At least one HDD may have the configuration shown in FIG. 7 and/or at least one DVD drive may have the configuration shown in FIG. 8. The HDD may be a mini-HDD that includes one or more platters having a diameter that is smaller than approximately 1.8". The HDTV 800 may be connected to memory 828 such as RAM, ROM, low-latency nonvolatile memory such as flash memory, and/or other suitable electronic data storage. The HDTV 800 also may support connections with a WLAN via a WLAN network interface 829.

Figure 10:
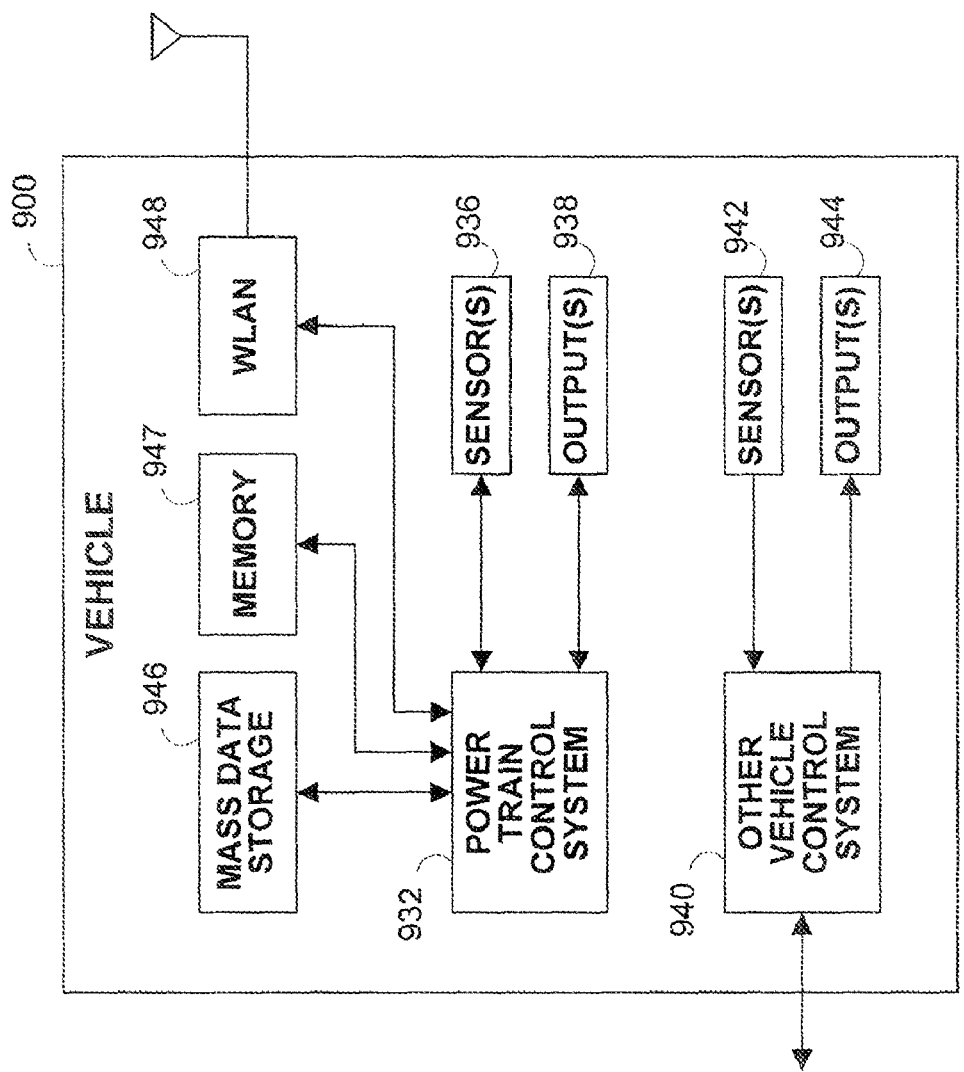
FIG. 10 is a block diagram of an exemplary vehicle that can employ the disclosed technology.

Referring now to FIG. 10, the present invention implements a control system of a vehicle 900, a WLAN interface and/or mass data storage of the vehicle control system. In some implementations, the present invention may implement a powertrain control system 932 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 940 of the vehicle 900. The control system 940 may likewise receive signals from input sensors 942 and/or output control signals to one or more output devices 944. In some implementations, the control system 940 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 932 may communicate with mass data storage 946 that stores data in a nonvolatile manner. The mass data storage 946 may include optical and/or magnetic storage devices for example hard disk drives HDD and/or DVDs. At least one HDD may have the configuration shown in FIG. 7 and/or at least one DVD drive may have the configuration shown in FIG. 8. The HDD may be a mini-HDD that includes one or more platters having a diameter that is smaller than approximately 1.8". The powertrain control system 932 may be connected to memory 947 such as RAM, ROM, low latency nonvolatile memory such as flash memory, and/or other suitable electronic data storage. The powertrain control system 932 also may support connections with a WLAN via a WLAN network interface 948. The control system 940 may also include mass data storage, memory and/or a WLAN interface (none shown).

Figure 11:
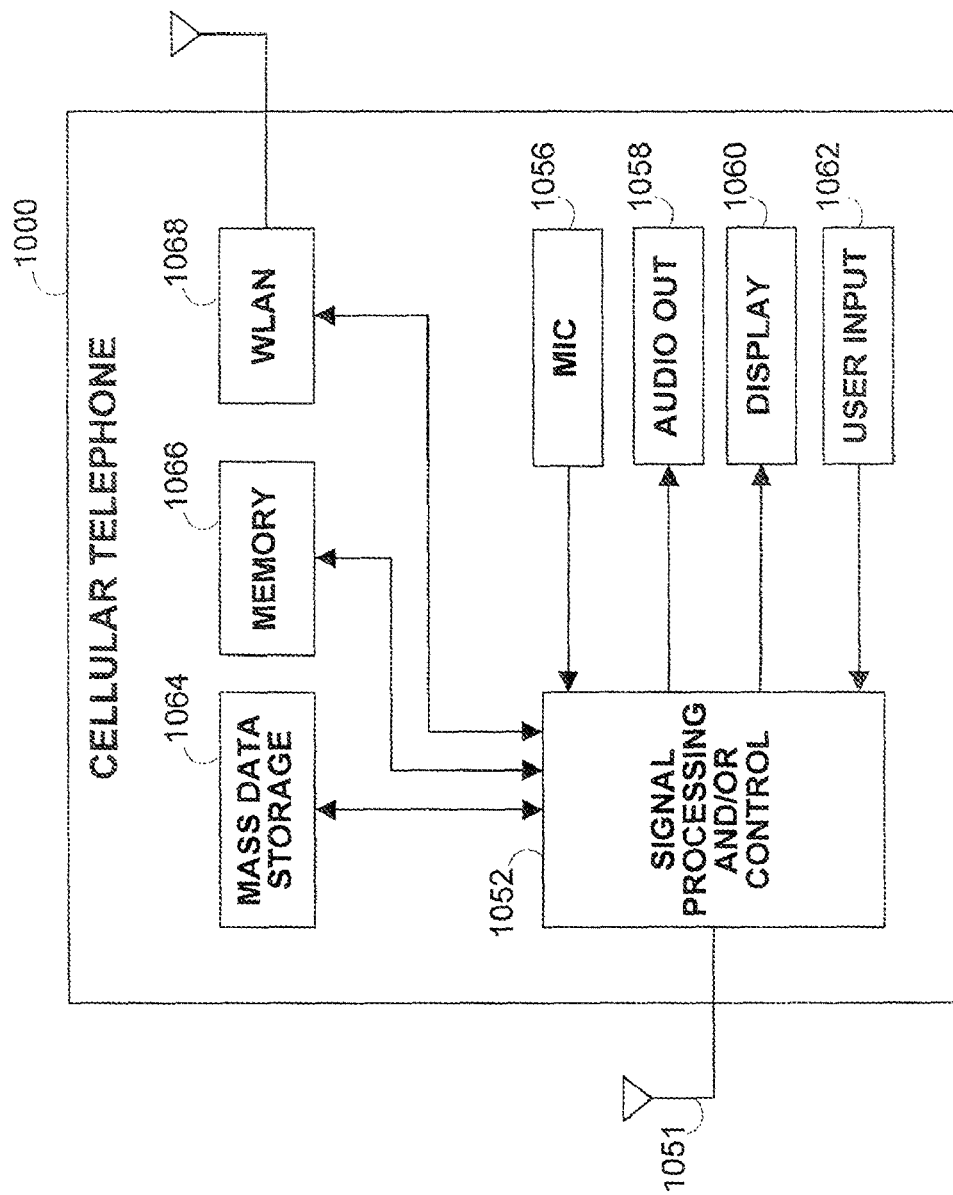
FIG. 11 is a block diagram of an exemplary cellular telephone that can employ the disclosed technology.

Referring now to FIG. 11, the present invention can be implemented in a cellular telephone 1000 that may include a cellular antenna 1051. The present invention may implement either or both signal processing and/or control circuits, which are generally identified in FIG. 11 at 1052, a WLAN interface and/or mass data storage of the cellular phone 1000. In some implementations, the cellular telephone 1000 includes a microphone 1056, an audio output 1058 such as a speaker and/or audio output jack, a display 1060 and/or an input device 1062 such as a keypad, pointing device, voice actuation and/or other input device. The signal processing and/or control circuits 1052 and/or other circuits (not shown) in the cellular telephone 1000 may process data, perform coding and/or encryption, perform calculations, format data and/or perform other cellular telephone functions.

The cellular telephone 1000 may communicate with mass data storage 1064 that stores data in a nonvolatile manner such as optical and/or magnetic storage devices—for example hard disk drives (HDDs) and/or DVDs. At least one HDD may have the configuration shown in FIG. 7 and/or at least one DVD drive may have the configuration shown in FIG. 8. The HDD may be a mini-HDD that includes one or more platters having a diameter that is smaller than approximately 1.8". The cellular telephone 1000 may be connected to memory 1066 such as RAM, ROM, low-latency nonvolatile memory such as flash memory, and/or other suitable electronic data storage. The cellular telephone 1000 also may support connections with a WLAN via a WLAN network interface 1068.

Figure 12:
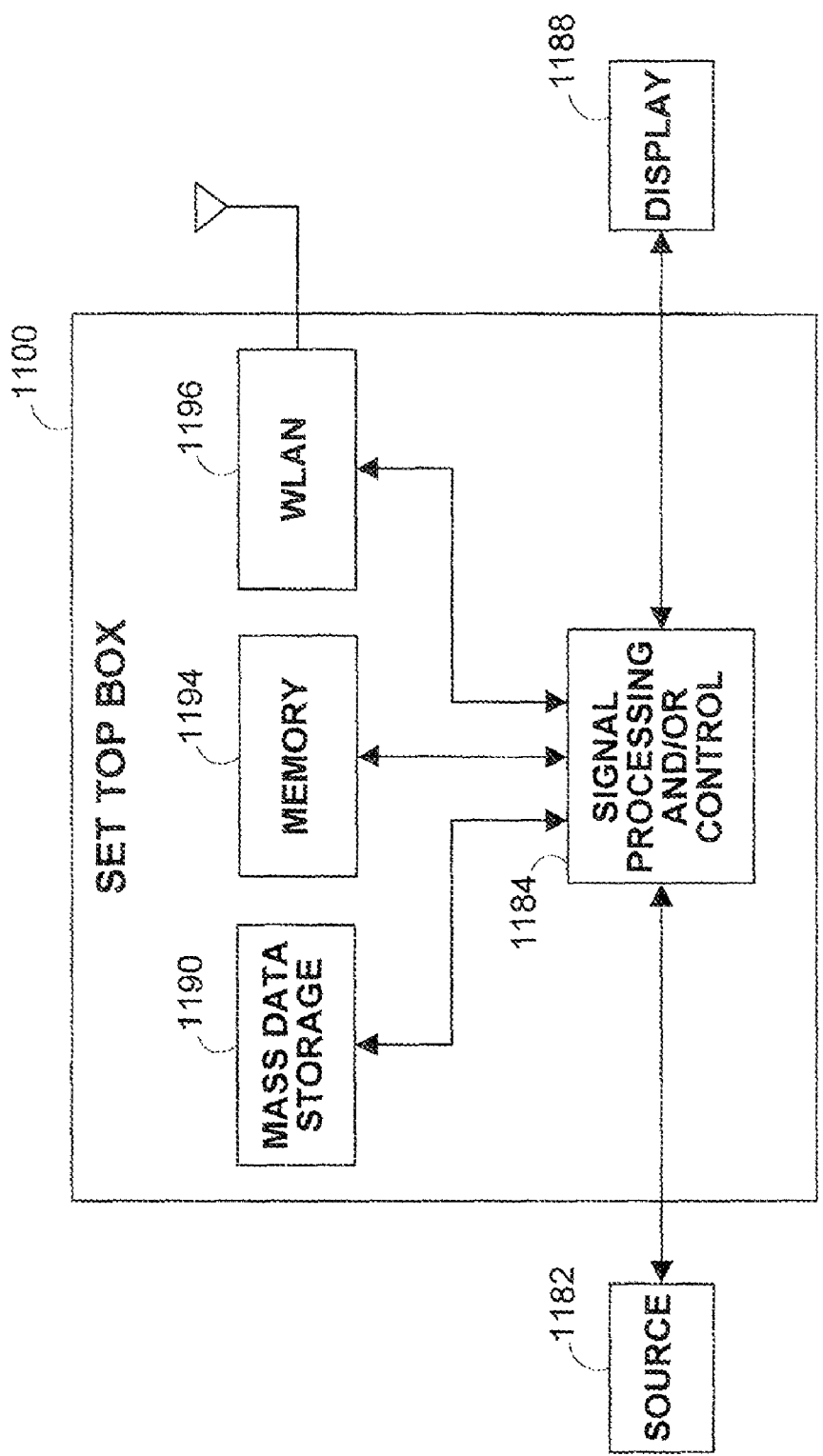
FIG. 12 is a block diagram of an exemplary set top box that can employ the disclosed technology.

Referring now to FIG. 12, the present invention can be implemented in a set top box 1100. The present invention may implement either or both signal processing and/or control circuits, which are generally identified in FIG. 12 at 1184, a WLAN interface and/or mass data storage of the set top box 1100. Set top box 1100 receives signals from a source 1182 such as a broadband source and outputs standard and/or high definition audio/video signals suitable for a display 1188 such as a television and/or monitor and/or other video and/or audio output devices. The signal processing and/or control circuits 1184 and/or other circuits (not shown) of the set top box 1100 may process data, perform coding and/or encryption, perform calculations, format data and/or perform any other set top box function.

Set top box 1100 may communicate with mass data storage 1190 that stores data in a nonvolatile manner. The mass data storage 1190 may include optical and/or magnetic storage devices for example hard disk drives HDD and/or DVDs. At least one HDD may have the configuration shown in FIG. 7 and/or at least one DVD drive may have the configuration shown in FIG. 8. The HDD may be a mini-HDD that includes one or more platters having a diameter that is smaller than approximately 1.8". Set top box 1100 may be connected to memory 1194 such as RAM, ROM, low-latency nonvolatile memory such as flash memory, and/or other suitable electronic data storage. Set top box 1100 also may support connections with a WLAN via a WLAN network interface 1196.

Figure 13:
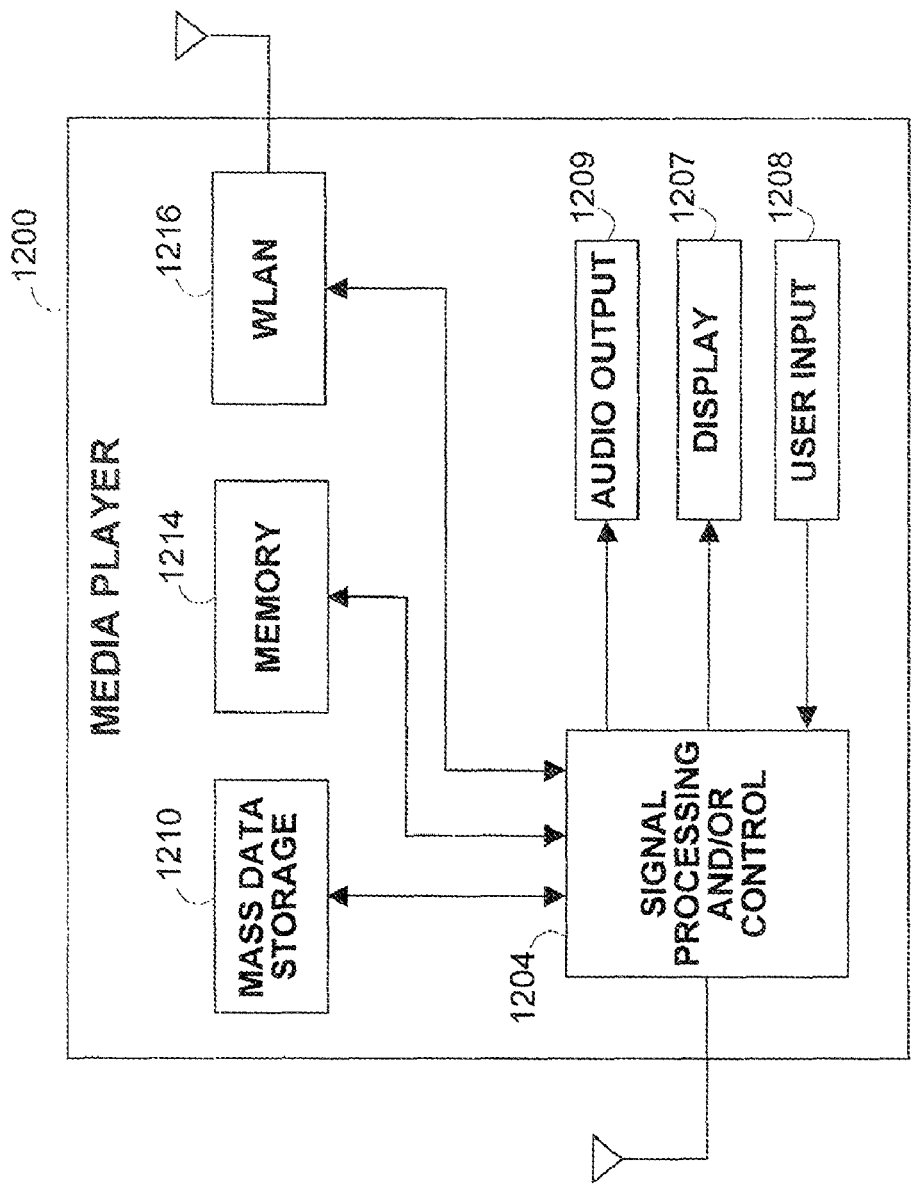
FIG. 13 is a block diagram of an exemplary media player that can employ the disclosed technology.

Referring now to FIG. 13, the present invention can be implemented in a media player 1200. The present invention may implement either or both signal processing and/or control circuits, which are generally identified in FIG. 13 at 1204, a WLAN interface and/or mass data storage of the media player 1200. In some implementations, the media player 1200 includes a display 1207 and/or a user input 1208 such as a keypad, touchpad and the like. In some implementations, the media player 1200 may employ a graphical user interface (GUI) that typically employs menus, drop down menus, icons and/or a point-and-click interface via the display 1207 and/or user input 1208. Media player 1200 further includes an audio output 1209 such as a speaker and/or audio output jack. The signal processing and/or control circuits 1204 and/or other circuits (not shown) of media player 1200 may process data, perform coding and/or encryption, perform calculations, format data and/or perform any other media player function.

Media player 1200 may communicate with mass data storage 1210 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 7 and/or at least one DVD drive may have the configuration shown in FIG. 7. The HDD may be a mini-HDD that includes one or more platters having a diameter that is smaller than approximately 1.8". Media player 1200 may be connected to memory 1214 such as RAM, ROM, low-latency nonvolatile memory such as flash memory, and/or other suitable electronic data storage. Media player 1200 also may support connections with a WLAN via a WLAN network interface 1216. Still other implementations in addition to those described above are contemplated.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for controlling a motor, said motor having a number of poles, said method comprising:
   detecting back-EMF from pole-pair interactions;
   deriving, from said detected back-EMF, information regarding periods of respective poles, and a back-EMF profile; and
   determining a drive profile from said back-EMF profile using said information regarding periods.

2. The method of claim 1 wherein said detecting comprises detecting respective interactions of each respective rotor pole with a predetermined stator pole.

3. The method of claim 1 wherein said detecting comprises detecting respective interactions of each respective stator pole with a predetermined rotor pole.

4. The method of claim 1 wherein said information regarding periods comprises length of each said period.

5. The method of claim 1 further comprising storing said information regarding periods.

6. The method of claim 5 wherein said storing comprises storing said information regarding periods in a motor controller.

7. The method of claim 6 wherein said determining is carried out by a motor control interface using said stored information regarding periods.

8. The method of claim 5 wherein said storing comprises storing said information regarding periods in a motor control interface.

9. The method of claim 8 wherein said determining is carried out by said motor control interface using said stored information regarding periods.

10. The method of claim 1 wherein said determining comprises:
sampling said back-EMF profile; and
assigning samples of said back-EMF profile to particular ones of said periods based on said information regarding periods.

11. Apparatus for controlling a motor, said motor having a number of poles, said apparatus comprising:
means for detecting back-EMF from pole-pair interactions;
means for deriving, from said detected back-EMF, information regarding periods of respective poles, and a back-EMF profile; and
means for determining a drive profile from said back-EMF profile using said information regarding periods.

12. The apparatus of claim 11 wherein said means for detecting detects respective interactions of each respective rotor pole with a predetermined stator pole.

13. The apparatus of claim 11 wherein said means for detecting detects respective interactions of each respective stator pole with a predetermined rotor pole.

14. The apparatus of claim 11 wherein said information regarding periods comprises length of each said period.

15. The apparatus of claim 11 further comprising means for storing said information regarding periods.

16. The apparatus of claim 15 further comprising:
means for motor control; wherein:
said means for storing comprises memory means in said means for motor control.

17. The apparatus of claim 16 further comprising:
a means for motor control interfacing; wherein:
said means for determining is part of said means for motor control interfacing and operates on said stored information regarding periods.

18. The apparatus of claim 15 further comprising:
means for motor control interfacing; wherein:
said means for storing comprises memory means in said means for motor control interfacing.

19. The apparatus of claim 18 wherein said means for determining is part of said means for motor control interfacing and operates on said stored information regarding periods.

20. The apparatus of claim 11 wherein said means for determining comprises:
means for sampling said back-EMF profile; and
means for assigning samples of said back-EMF profile to particular ones of said periods based on said information regarding periods.

21. Apparatus for controlling a motor, said motor having a number of poles, said apparatus comprising:
back-EMF detection circuitry that detects back-EMF from pole-pair interactions; and
a processor that:
derives, from said detected back-EMF, information regarding periods of respective poles, and a back-EMF profile; and
determines a drive profile from said back-EMF profile using said information regarding periods.

22. The apparatus of claim 21 wherein said back-EMF detection circuitry detects respective interactions of each respective rotor pole with a predetermined stator pole.

23. The apparatus of claim 21 wherein said back-EMF detection circuitry detects respective interactions of each respective stator pole with a predetermined rotor pole.

24. The apparatus of claim 21 wherein said information regarding periods comprises length of each said period.

25. The apparatus of claim 21 further comprising memory that stores said information regarding periods.

26. The apparatus of claim 25 further comprising:
a motor controller; wherein:
said memory is in said motor controller.

27. The apparatus of claim 26 further comprising:
a motor control interface; wherein:
said processor is part of said motor control interface and operates on said stored information regarding periods.

28. The apparatus of claim 25 further comprising:
a motor control interface; wherein:
said memory is in said motor control interface.

29. The apparatus of claim 28 wherein said processor is part of said motor control interface and operates on said stored information regarding periods.

30. The apparatus of claim 21 wherein said processor:
controls sampling said back-EMF profile; and
assigns samples of said back-EMF profile to particular ones of said periods based on said information regarding periods.

* * * * *